(12) United States Patent
Lea et al.

(10) Patent No.: US 6,198,911 B1
(45) Date of Patent: Mar. 6, 2001

(54) CONTROLLING TRANSMITTER GAIN IN A WIRELESS TELECOMMUNICATIONS SYSTEM

(75) Inventors: Raymond G. Lea, Basingstoke; Martin Lysejko, Bagshot, both of (GB)

(73) Assignee: Airspan Networks, Inc., Seattle, WA (US)

( * ) Notice: Subject to any disclaimer, the term of this patent is extended or adjusted under 35 U.S.C. 154(b) by 0 days.

(21) Appl. No.: 09/120,977

(22) Filed: Jul. 22, 1998

Related U.S. Application Data

(63) Continuation of application No. 08/559,330, filed on Nov. 16, 1995.

(30) Foreign Application Priority Data

Jun. 2, 1995 (GB) .................................................. 9510870
Jul. 7, 1995 (GB) .................................................. 9513912

(51) Int. Cl.[7] .................................................. H01Q 11/12
(52) U.S. Cl. ........................... 455/126; 455/127; 455/102
(58) Field of Search ............................... 455/102, 103, 455/115, 116, 126, 127; 330/129

(56) References Cited

U.S. PATENT DOCUMENTS

| | | | |
|---|---|---|---|
| 5,105,164 | 4/1992 | Fisher et al. | 330/149 |
| 5,128,629 | 7/1992 | Trinh | 330/129 |
| 5,144,258 | 9/1992 | Nakanishi et al. | 330/129 |
| 5,302,914 | 4/1994 | Arntz et al. | 330/129 |
| 5,303,395 | 4/1994 | Dayani | 455/127 |
| 5,526,529 | 6/1996 | Tamano | 455/103 |
| 5,530,920 | 6/1996 | Takeda | 455/102 |

FOREIGN PATENT DOCUMENTS

| | | | |
|---|---|---|---|
| 0392132 | 10/1990 | (EP) | H04B/7/005 |
| 0565505 | 10/1993 | (EP) | H04B/7/005 |

*Primary Examiner*—Reinhard J. Eisenzopf
*Assistant Examiner*—Sam Bhattacharya
(74) *Attorney, Agent, or Firm*—Baker Botts L.L.P.

(57) ABSTRACT

A central terminal (10) in a wireless telecommunications system (1) includes an analog card (206) that combines inputs from a plurality of modem units (204) for a plurality of downlink communication paths. The analog card (206) generates a composite transmit signal (214) that is provided to a radio frequency card (208). The radio frequency card (208) prepares the composite transmit signal (214) for radio frequency transmission from the central terminal (10). A power amplifier (218) in a combining shelf (201) amplifies the composite transmit signal (214) to a desired transmitting level. A detector (240) measures a power output of the power amplifier (218). The power output measurement determined by the detector (240) is collected by a combiner monitor (222) and delivered to a shelf controller (210) of the modem shelf (200). The shelf controller (210) provides the power output measurement to the analog card (206). The analog card (206) compares the power output measurement to power estimates of the inputs from the modem units (204). The analog card (206) generates an adjustment signal (242) to control the power output from the power amplifier (218) by adjusting a gain of the radio frequency card in accordance with the comparison.

10 Claims, 8 Drawing Sheets

FIG. 5A
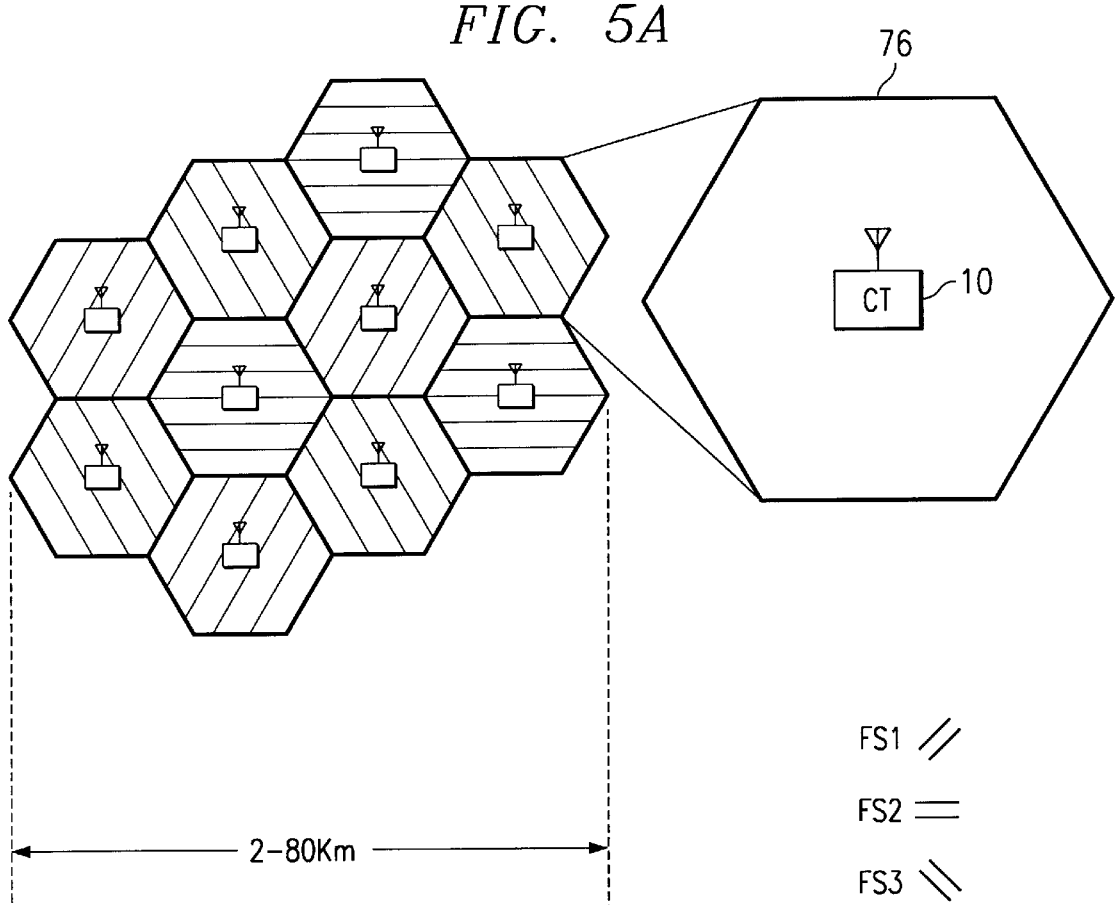
FS1 //
FS2 =
FS3 \\
2-80Km
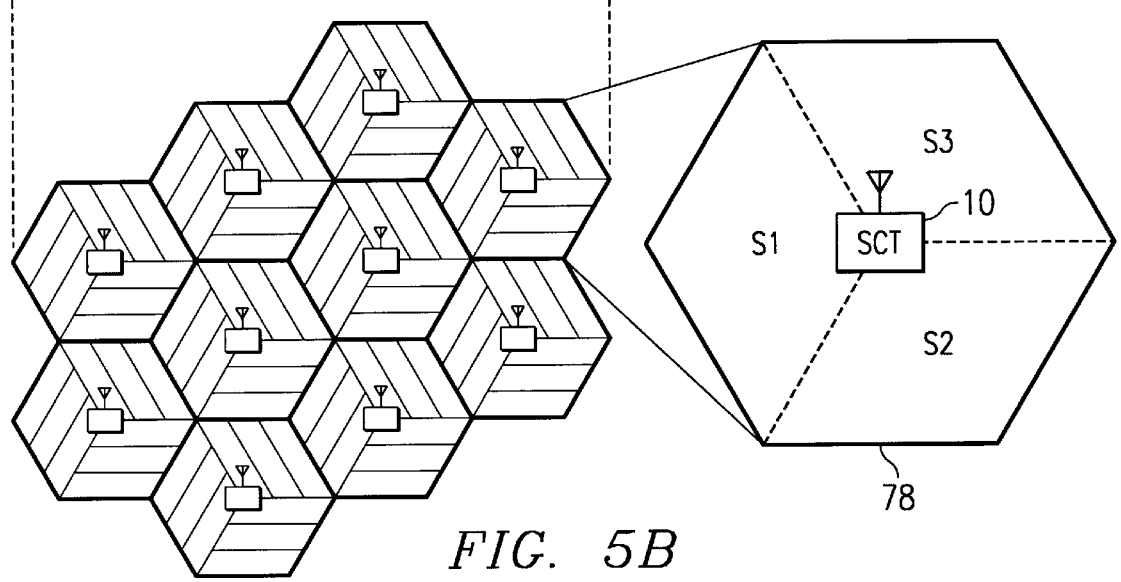
FIG. 5B

CONTROLLING TRANSMITTER GAIN IN A WIRELESS TELECOMMUNICATIONS SYSTEM

This application is a continuation of Ser. No. 08/559,330, filed Nov. 16, 1995.

TECHNICAL FIELD OF THE INVENTION

The present invention relates in general to telecommunications technology and more particularly to an apparatus and a method of controlling transmitter gain in a wireless telecommunications system.

BACKGROUND OF THE INVENTION

In order to meet transmitted power specifications, radio frequency gain should be accurate in a wireless telecommunications system. However, inaccuracies typically occur in the radio frequency gain of wireless telecommunications systems. These inaccuracies may occur as a result of effects such as shifts in tolerances, temperature variations, and device limitations, among others. Therefore, it is desirable to eliminate or reduce these effects on the accuracy of the radio frequency gain.

SUMMARY OF THE INVENTION

From the foregoing, a need has arisen for a method and an apparatus that controls the radio frequency gain in a wireless telecommunications system to compensate for inaccuracy causing effects.

An object of the invention is to provide an apparatus and a method of controlling transmitter gain in a wireless telecommunications system that substantially eliminate or reduce disadvantages and problems associated with conventional wireless telecommunications systems.

From the foregoing, it may be appreciated that a need has arisen for a method and device that controls the radio frequency gain in a wireless telecommunications system to compensate for inaccuracy causing effects. In accordance with the present invention, there is provided an apparatus and method of controlling transmitter gain in a wireless telecommunications system that substantially eliminates or reduces disadvantages and problems associated with conventional wireless telecommunications system.

According to an embodiment of the present invention, a method of controlling transmitter power in a wireless telecommunications system is provided that includes transmitting a composite transmit signal. The composite transmit signal carries information from inputs for a plurality of downlink communication signals. An output radio frequency power of the composite transmit signal is sampled and compared to the inputs for the plurality of downlink communication paths. A gain of the output radio frequency power is adjusted according to results of the comparison.

The present invention provides various technical advantages over conventional wireless telecommunications systems. For example, one technical advantage is to control a gain of an output radio frequency power for a composite transmit signal. Another technical advantage is to eliminate or reduce effects affecting the accuracy of the gain of the output radio frequency power. Yet another technical advantage is to maintain a constant gain for the output radio frequency power. Other technical advantages are readily apparent to one skilled in the art from the following figures, description, and claims.

BRIEF DESCRIPTION OF THE DRAWINGS

An embodiment of the invention will be described hereinafter, by way of example only, with reference to the accompanying drawings in which like reference signs are used for like features and in which:

FIGS. 5A and 5B are schematic diagrams illustrating possible configurations for cells for the telecommunications system of FIG. 1;

DETAILED DESCRIPTION OF THE INVENTION

Figure 1:
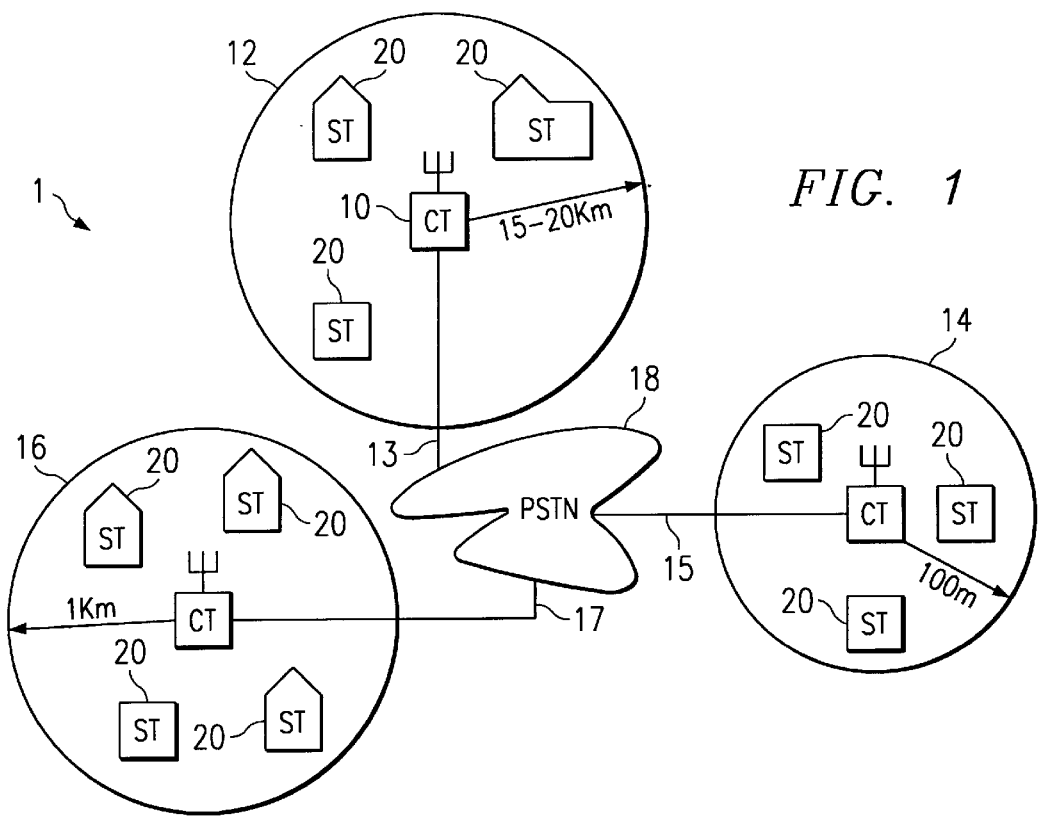
FIG. 1 is a schematic overview of an example of a wireless telecommunications system in which an example of the present invention is included.

FIG. 1 is a schematic overview of an example of a wireless telecommunications system. The telecommunications system includes one or more service areas 12, 14 and 16, each of which is served by a respective central terminal (CT) 10 which establishes a radio link with subscriber terminals (ST) 20 within the area concerned. The area which is covered by a central terminal 10 can vary. For example, in a rural area with a low density of subscribers, a service area 12 could cover an area with a radius of 15–20 Km. A service area 14 in an urban environment where is there is a high density of subscriber terminals 20 might only cover an area with a radius of the order of 100 m. In a suburban area with an intermediate density of subscriber terminals, a service area 16 might cover an area with a radius of the order of 1 Km. It will be appreciated that the area covered by a particular central terminal 10 can be chosen to suit the local requirements of expected or actual subscriber density, local geographic considerations, etc, and is not limited to the examples illustrated in FIG. 1. Moreover, the coverage need not be, and typically will not be circular in extent due to antenna design considerations, geographical factors, buildings and so on, which will affect the distribution of transmitted signals.

The central terminals 10 for respective service areas 12, 14, 16 can be connected to each other by means of links 13, 15 and 17 which interface, for example, with a public switched telephone network (PSTN) 18. The links can include conventional telecommunications technology using copper wires, optical fibres, satellites, microwaves, etc.

The wireless telecommunications system of FIG. 1 is based on providing fixed microwave links between subscriber terminals 20 at fixed locations within a service area (e.g., 12, 14, 16) and the central terminal 10 for that service area. In a preferred embodiment each subscriber terminal 20 is provided with a permanent fixed access link to its central terminal 10. However, in alternative embodiments demand-based access could be provided, so that the number of subscribers which can be serviced exceeds the number of telecommunications links which can currently be active.

Figure 2:
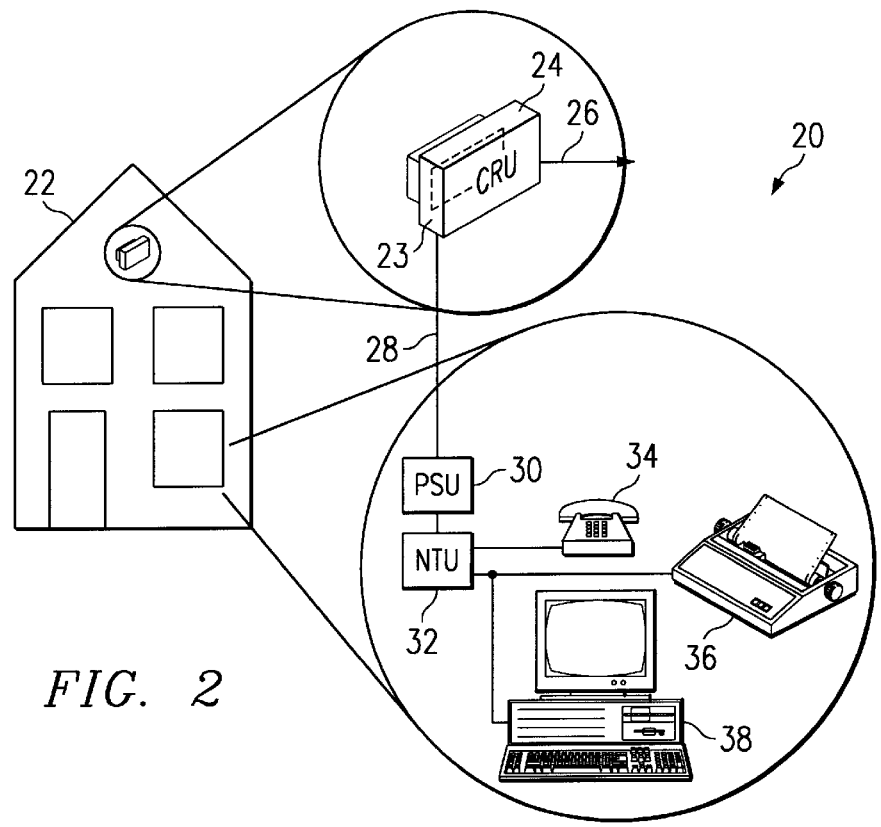
FIG. 2 is a schematic illustration of an example of a subscriber terminal of the telecommunications system of FIG. 1.

FIG. 2 illustrates an example of a configuration for a subscriber terminal 20 for the telecommunications system of FIG. 1. FIG. 2 includes a schematic representation of customer premises 22. A customer radio unit (CRU) 24 is mounted on the customer's premises. The customer radio unit 24 includes a flat panel antenna or the like 23. The customer radio unit is mounted at a location on the customer's premises, or on a mast, etc., and in an orientation such that the flat panel antenna 23 within the customer radio unit 24 faces in the direction 26 of the central terminal 10 for the service area in which the customer radio unit 24 is located.

The customer radio unit 24 is connected via a drop line 28 to a power supply unit (PSU) 30 within the customer's premises. The power supply unit 30 is connected to the local power supply for providing power to the customer radio unit 24 and a network terminal unit (NTU) 32. The customer radio unit 24 is also connected to via the power supply unit 30 to the network terminal unit 32, which in turn is connected to telecommunications equipment in the customer's premises, for example to one or more telephones 34, facsimile machines 36 and computers 38. The telecommunications equipment is represented as being within a single customer's premises. However, this need not be the case, as the subscriber terminal 20 preferably supports either a single or a dual line, so that two subscriber lines could be supported by a single subscriber terminal 20. The subscriber terminal 20 can also be arranged to support analogue and digital telecommunications, for example analogue communications at 16, 32 or 64 kbits/sec or digital communications in accordance with the ISDN BRA standard.

Figure 3:
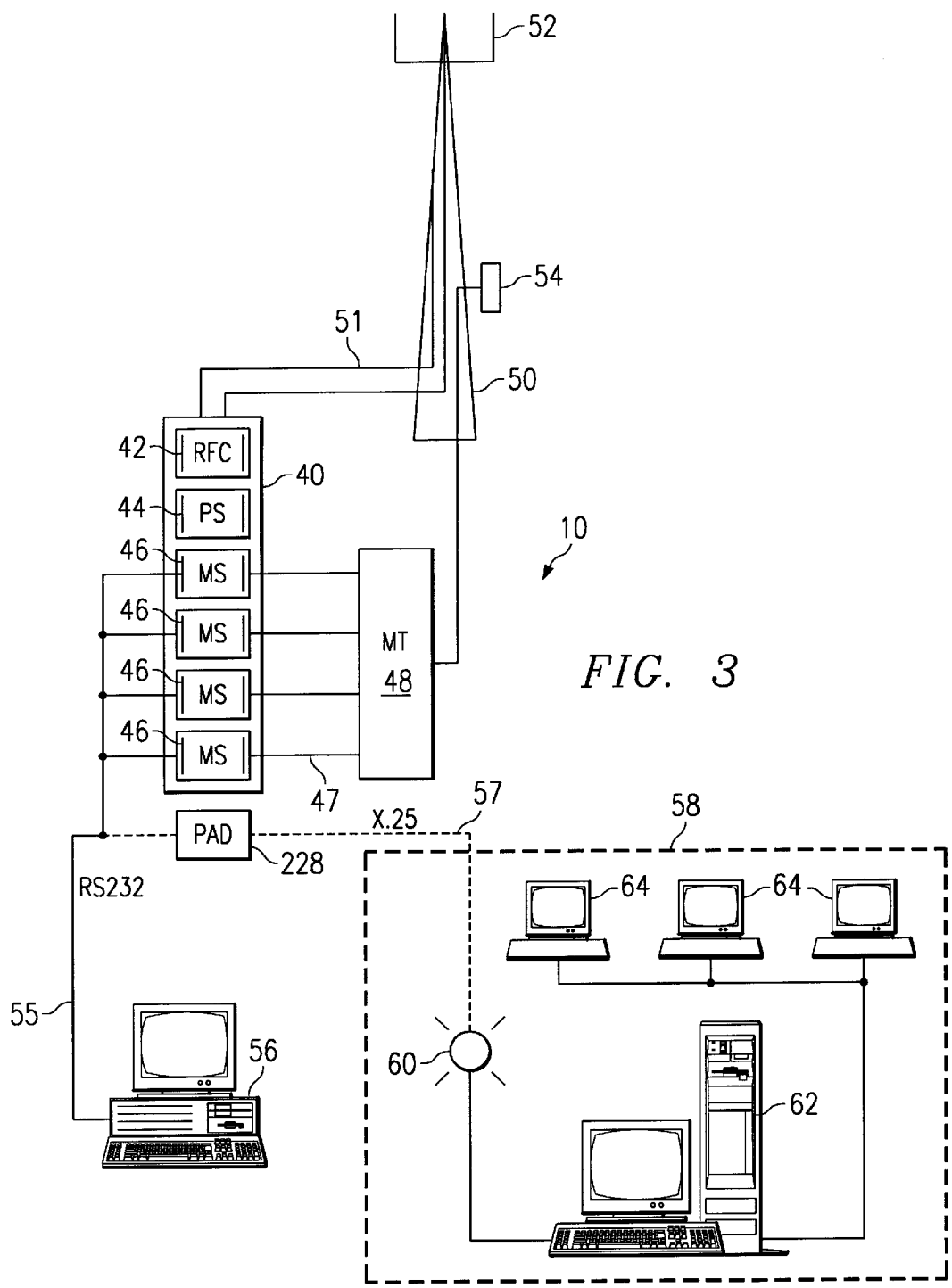
FIG. 3 is a schematic illustration of an example of a central terminal of the telecommunications system of FIG. 1.

FIG. 3 is a schematic illustration of an example of a central terminal of the telecommunications system of FIG. 1. The common equipment rack 40 comprises a number of equipment shelves 42, 44, 46, including a RF Combiner and power amp shelf (RFC) 42, a Power Supply shelf (PS) 44 and a number of (in this example four) Modem Shelves (MS) 46. The RF combiner shelf 42 allows the four modem shelves 46 to operate in parallel. It combines and amplifies the power of four transmit signals, each from a respective one of the four modem shelves, and amplifies and splits received signals four way so that separate signals may be passed to the respective modem shelves. The power supply shelf 44 provides a connection to the local power supply and fusing for the various components in the common equipment rack 40. A bidirectional connection extends between the RF combiner shelf 42 and the main central terminal antenna 52, typically an omnidirectional antenna, mounted on a central terminal mast 50.

This example of a central terminal 10 is connected via a point-to-point microwave link to a location where an interface to the public switched telephone network 18, shown schematically in FIG. 1, is made. As mentioned above, other types of connections (e.g., copper wires or optical fibres) can be used to link the central terminal 10 to the public switched telephone network 18. In this example the modem shelves are connected via lines 47 to a microwave terminal (MT) 48. A microwave link 49 extends from the microwave terminal 48 to a point-to-point microwave antenna 54 mounted on the mast 50 for a host connection to the public switched telephone network 18.

A personal computer, workstation or the like can be provided as a site controller (SC) 56 for supporting the central terminal 10. The site controller 56 can be connected to each modem shelf of the central terminal 10 via, for example, RS232 connections 55. The site controller 56 can then provide support functions such as the localisation of faults, alarms and status and the configuring of the central terminal 10. A site controller 56 will typically support a single central terminal 10, although a plurality of site controllers 56 could be networked for supporting a plurality of central terminals 10.

As an alternative to the RS232 connections 55, which extend to a site controller 56, data connections such as an X.25 links 57 (shown with dashed lines in FIG. 3) could instead be provided from a pad 228 to a switching node 60 of an element manager (EM) 58. An element manager 58 can support a number of distributed central terminals 10 connected by respective connections to the switching node 60. The element manager 58 enables a potentially large number (e.g., up to, or more than 1000) of central terminals 10 to be integrated into a management network. The element manager 58 is based around a powerful workstation 62 and can include a number of computer terminals 64 for network engineers and control personnel.

Figure 3A:
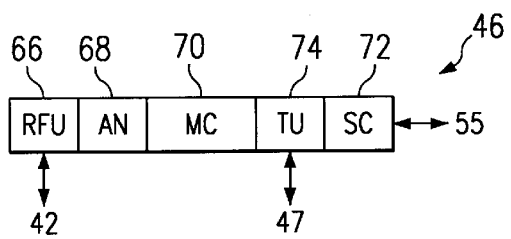
FIG. 3A is a schematic illustration of a modem shelf of a central terminal of the telecommunications system of FIG. 1.

FIG. 3A illustrates various parts of a modem shelf 46. A transmit/receive RF unit (RFU—for example implemented on a card in the modem shelf) 66 generates the modulated transmit RF signals at medium power levels and recovers and amplifies the baseband RF signals for the subscriber terminals. The RF unit 66 is connected to an analogue card (AN) 68 which performs A-D/D-A conversions, baseband filtering and the vector summation of 15 transmitted signals from the modem cards (MCs) 70. The analogue unit 68 is connected to a number of (typically 1–8) modem cards 70. The modem cards perform the baseband signal processing of the transmit and receive signals to/from the subscriber terminals 20. This includes ½ rate convolution coding and×16 spreading with CDMA codes on the transmit signals, and synchronisation recovery, despreading and error correction on the receive signals. Each modem card 70 in the present example has two modems, each modem supporting one subscriber link (or two lines) to a subscriber terminal 20. Thus, with two modems per card and 8 modems per modem shelf, each modem shelf could support 16 possible subscriber links. However, in order to incorporate redundancy so that a modem may be substituted in a subscriber link when a fault occurs, only up to 15 subscriber links are preferably supported by a single modem shelf 46. The 16th modem is then used as a spare which can be switched in if a failure of one of the other 15 modems occurs. The modem cards 70 are connected to the tributary unit (TU) 74 which terminates the connection to the host public switched telephone network 18 (e.g., via one of the lines 47) and handles the signalling of telephony information to, for example, up to 15 subscriber terminals (each via a respective one of 15 of the 16 modems).

Figure 4:
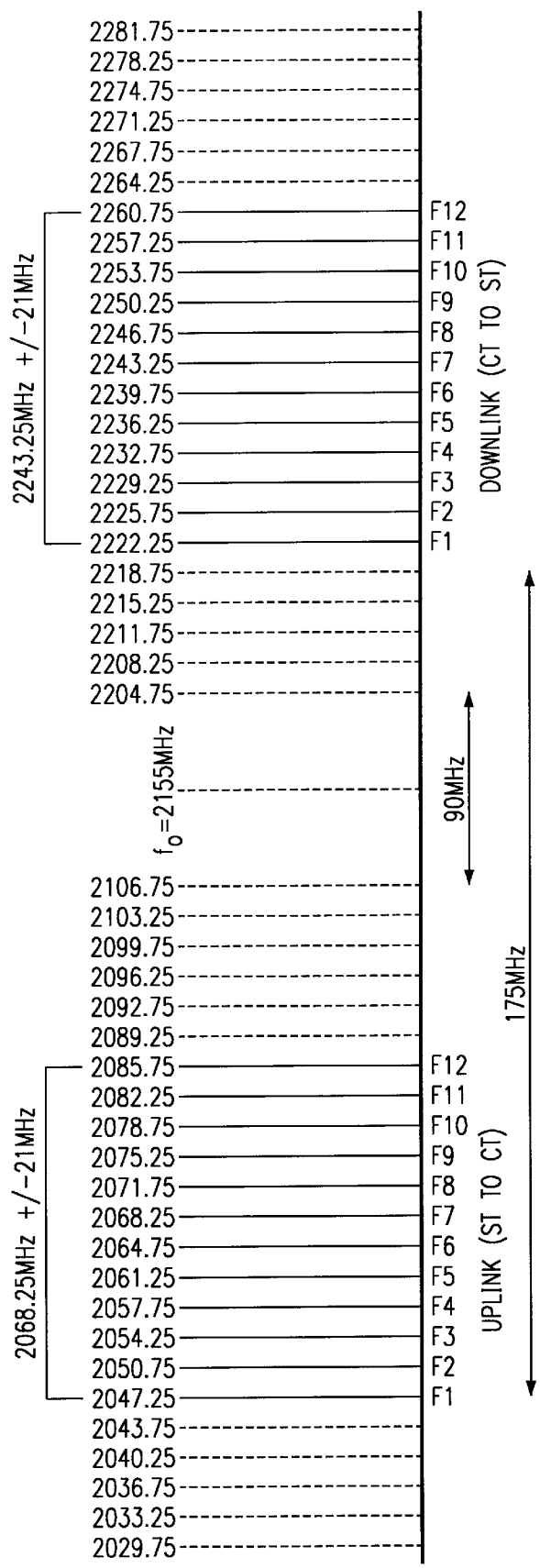
FIG. 4 is an illustration of an example of a frequency plan for the telecommunications system of FIG. 1.

The wireless telecommunications between a central terminal 10 and the subscriber terminals 20 could operate on various frequencies. FIG. 4 illustrates one possible example of the frequencies which could be used. In the present example, the wireless telecommunication system is intended to operate in the 1.5–2.5 GHz Band. In particular the present example is intended to operate in the Band defined by ITU-R (CCIR) Recommendation F.701 (2025–2110 MHz, 2200–2290 MHz). FIG. 4 illustrates the frequencies used for the uplink from the subscriber terminals 20 to the central terminal 10 and for the downlink from the central terminal 10 to the subscriber terminals 20. It will be noted that 12 uplink and 12 downlink radio channels of 3.5 MHz each are provided centred about 2155 MHz. The spacing between the receive and transmit channels exceeds the required minimum spacing of 70 MHz.

In the present example, as mentioned above, each modem shelf will support 1 frequency channel (i.e. one uplink frequency plus the corresponding downlink frequency). Up to 15 subscriber links may be supported on one frequency channel, as will be explained later. Thus, in the present embodiment, each central terminal 10 can support 60 links, or 120 lines.

Typically, the radio traffic from a particular central terminal 10 will extend into the area covered by a neighbouring central terminal 10. To avoid, or at least to reduce interference problems caused by adjoining areas, only a limited number of the available frequencies will be used by any given central terminal 10.

FIG. 5A illustrates one cellular type arrangement of the frequencies to mitigate interference problems between adjacent central terminals 10. In the arrangement illustrated in FIG. 5A, the hatch lines for the cells 76 illustrate a frequency set (FS) for the cells. By selecting three frequency sets (e.g., where: FS1=F1, F4, F7, F10; FS2=F2, F5, F8, F11; FS3=F3, F6, F9, F12), and arranging that immediately adjacent cells do not use the same frequency set (see, for example, the arrangement shown in FIG. 5A), it is possible to provide an array of fixed assignment omnidirectional cells where interference between nearby cells can be avoided. The transmitter power of each central terminal 10 is set such that transmissions do not extend as far as the nearest cell which is using the same frequency set. Thus each central terminal 10 can use the four frequency pairs (for the uplink and downlink, respectively) within its cell, each modem shelf in the central terminal 10 being associated with a respective RF channel (channel frequency pair).

With each modem shelf supporting one channel frequency (with 15 subscriber links per channel frequency) and four modem shelves, each central terminal 10 will support 60 subscriber links (i.e., 120 lines). The 10 cell arrangement in FIG. 5A can therefore support up to 600 ISDN links or 1200 analogue lines, for example. FIG. 5B illustrates a cellular type arrangement employing sectored cells to mitigate problems between adjacent central terminals 10. As with FIG. 5A, the different type of hatch lines in Figure SB illustrate different frequency sets. As in FIG. 5A, FIG. 5B represents three frequency sets (e.g., where: FS1=F1, F4, F7, F1; FS2=F2, F5, F8, F11; FS3=F3, F6, F9, F12). However, in FIG. 5B the cells are sectored by using a sectored central terminal (SCT) 13 which includes three central terminals 10, one for each sector S1, S2 and S3, with the transmissions for each of the three central terminals 10 being directed to the appropriate sector among S1, S2 and S3. This enables the number of subscribers per cell to be increased three fold, while still providing permanent fixed access for each subscriber terminal 20.

A seven cell repeat pattern is used such that for a cell operating on a given frequency, all six adjacent cells operating on the same frequency are allowed unique PN codes. This prevents adjacent cells from inadvertently decoding data.

Figure 6:
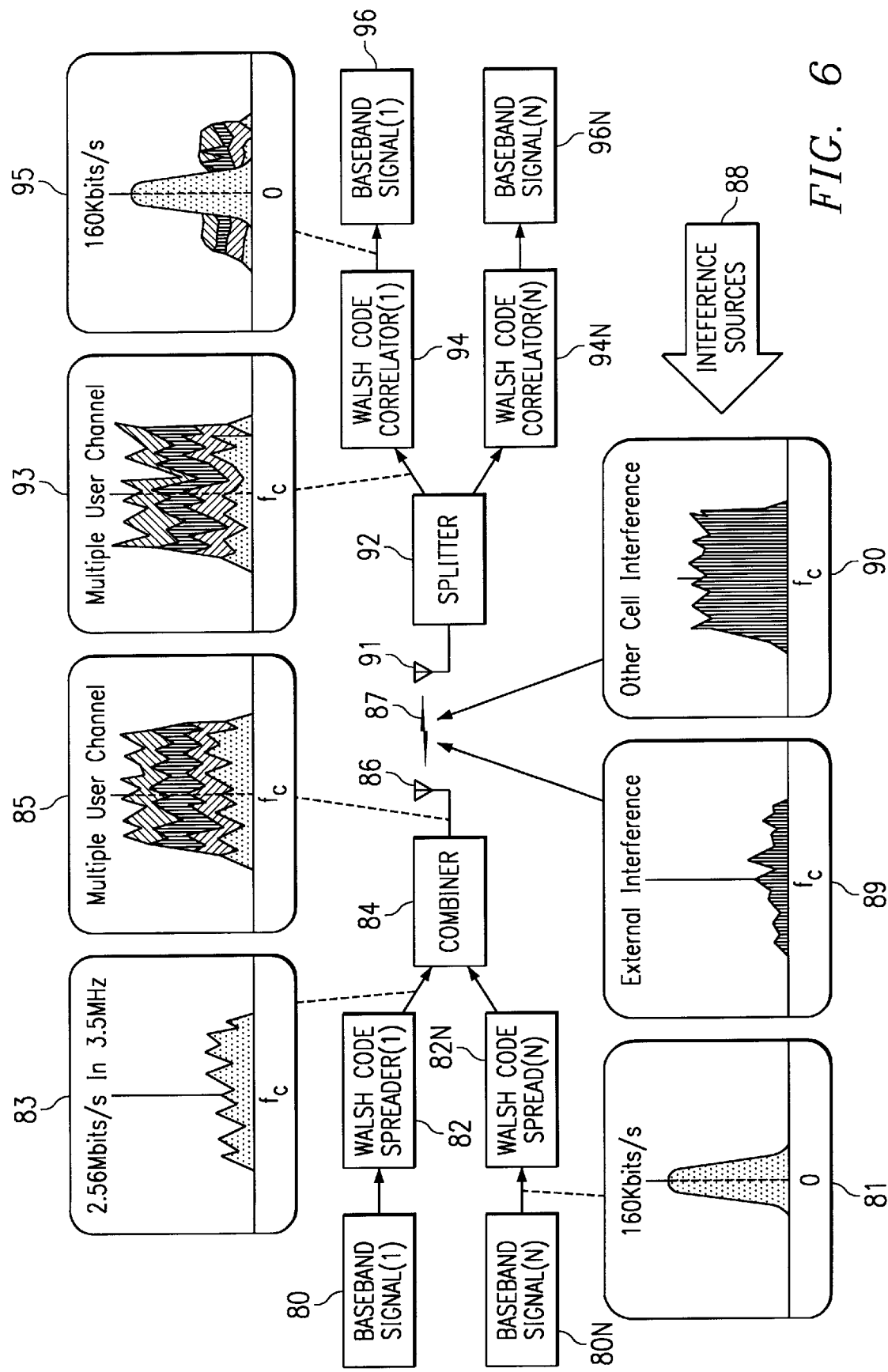
FIG. 6 is a schematic diagram illustrating aspects of a code division multiplex system for the telecommunications system of FIG. 1.

As mentioned above, each channel frequency can support 15 subscriber links. In this example, this is achieved using by multiplexing signals using a Code Division Multiplexed Access (CDMA) technique. FIG. 6 gives a schematic overview of CDMA encoding and decoding.

In order to encode a CDMA signal, base band signals, for example the user signals for each respective subscriber link, are encoded at 80–80N into a 160 ksymbols/sec baseband signal where each symbol represents 2 data bits (see, for example the signal represented at 81). This signal is then spread by a factor of 16 using a respective Walsh pseudo random noise (PN) code spreading function 82–82N to generate signals at an effective chip rate of 2.56 Msymbols/sec in 3.5 MHz. The signals for respective subscriber links are then combined and converted to radio frequency (RF) to give multiple user channel signals (e.g., 85) for transmission from the transmitting antenna 86.

During transmission, a transmitted signal will be subjected to interference sources 88, including external interference 89 and interference from other channels 90. Accordingly, by the time the CDMA signal is received at the receiving antenna 91, the multiple user channel signals may be distorted as is represented at 93.

In order to decode the signals for a given subscriber link from the received multiple user channel, a Walsh correlator 94–94N uses the same pseudo random noise (PN) code that was used for the encoding for each subscriber link to extract a signal (e.g, as represented at 95) for the respective received baseband signal 96–96N. It will be noted that the received signal will include some residual noise. However, unwanted noise can be removed using a low pass filter and signal processing.

The key to CDMA is the application of orthogonal codes that allow the multiple user signals to be transmitted and received on the same frequency at the same time. Once the bit stream is orthogonally isolated using the Walsh codes, the signals for respective subscriber links do not interfere with each other.

Walsh codes are a mathematical set of sequences that have the function of "orthonormality". In other words, if any Walsh code is multiplied by any other Walsh code, the results are zero.

Figure 7:
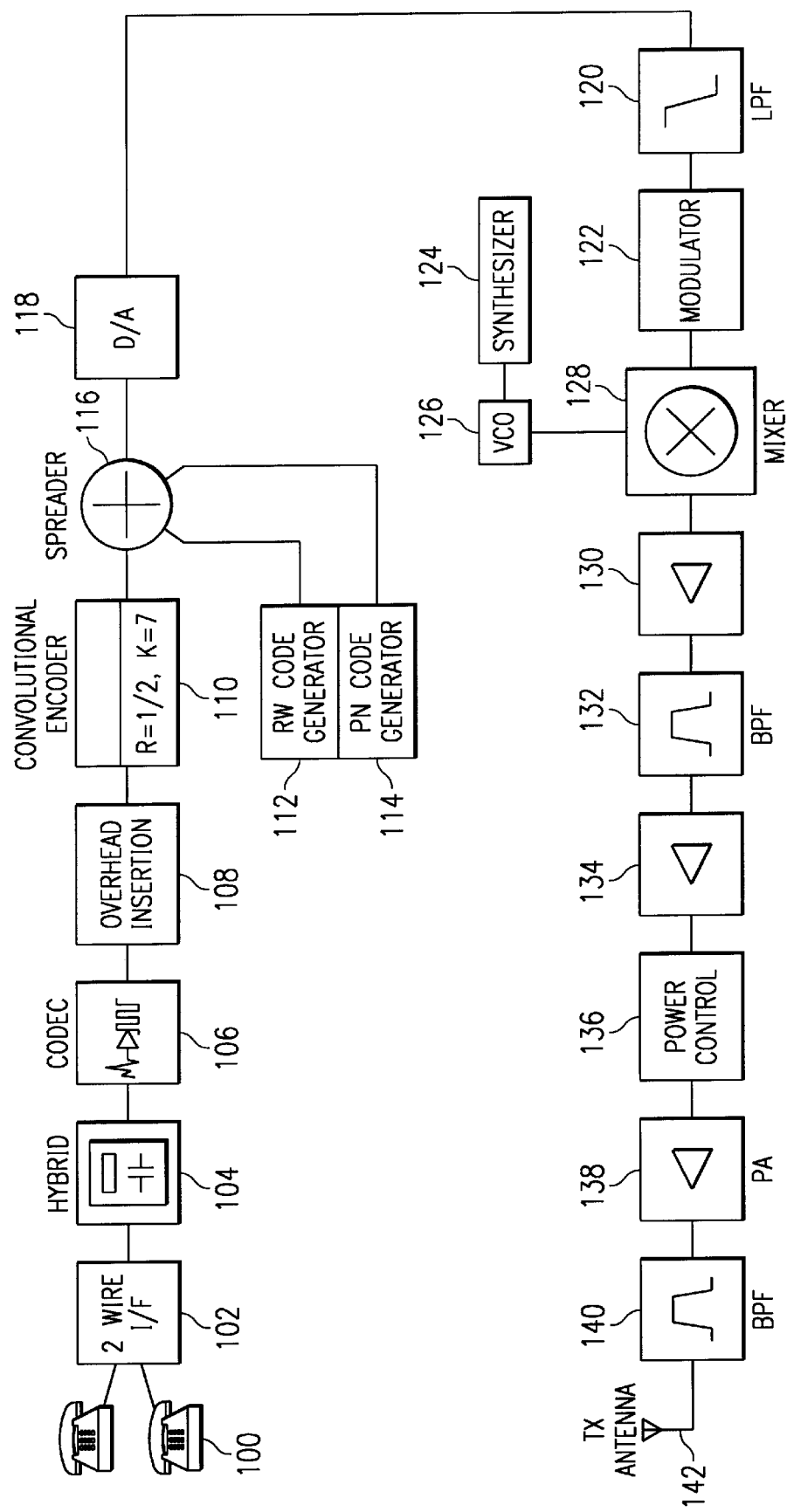
FIG. 7 is a schematic diagram illustrating signal transmission processing stages for the telecommunications system of FIG. 1.

FIG. 7 is a schematic diagram illustrating signal transmission processing stages as configured in a subscriber terminal 20 in the telecommunications system of FIG. 1. The central terminal is also configured to perform equivalent signal transmission processing. In FIG. 7, an analogue signal from one of a pair of telephones is passed via a two-wire interface 102 to a hybrid audio processing circuit 104 and then via a codec 106 to produce a digital signal into which an overhead channel including control information is inserted at 108. The resulting signal is processed by a convolutional encoder 110 before being passed to a spreader 116 to which the Rademacher-Walsh and PN codes are applied by a RW code generator 112 and PN Code generator 114, respectively. The resulting signals are passed via a digital to analogue converter 118. The digital to analogue converter 118 shapes the digital samples into an analogue waveform and provides a stage of baseband power control. The signals are then passed to a low pass filter 120 to be modulated in a modulator 122. The modulated signal from the modulator 122 is mixed with a signal generated by a voltage controlled oscillator 126 which is responsive to a synthesizer 160. The output of the mixer 128 is then amplified in a low noise amplifier 130 before being passed via a band pass filter 132. The output of the band pass filter 132 is further amplified in a further low noise amplifier 134, before being passed to power control circuitry 136. The output of the power control circuitry is further amplified in a further low noise amplifier 138 before being passed via a further band pass filter 140 and transmitted from the transmission antenna 142.

Figure 8:
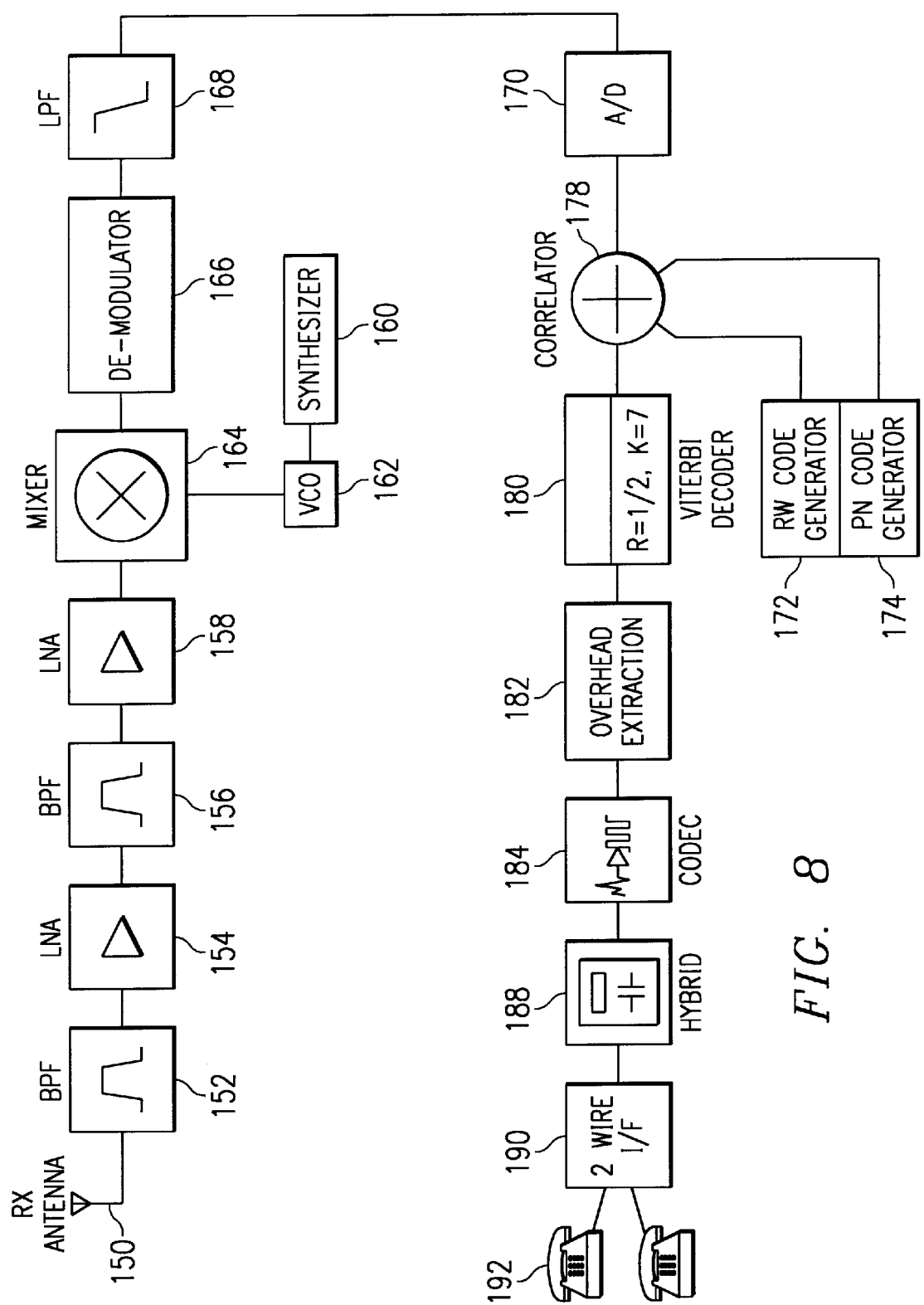
FIG. 8 is a schematic diagram illustrating signal reception processing stages for the telecommunications system of FIG. 1.

FIG. 8 is a schematic diagram illustrating the equivalent signal reception processing stages as configured in a subscriber terminal 20 in the telecommunications system of FIG. 1. The central terminal is also configured to perform equivalent signal reception processing. In FIG. 8, signals received at a receiving antenna 150 are passed via a band pass filter 152 before being amplified in a low noise amplifier 154. The output of the amplifier 154 is then passed via a further band pass filter 156 before being further amplified by a further low noise amplifier 158. The output of the amplifier 158 is then passed to a mixer 164 where it is mixed with a signal generated by a voltage controlled oscillator 162 which is responsive to a synthesizer 160. The output of the mixer 164 is then passed via the de-modulator 166 and a low pass filter 168 before being passed to an analogue to digital converter 170. The digital output of the A/D converter 170 is then passed to a correlator 178, to which the same Rademacher-Walsh and PN codes used during transmission are applied by a RW code generator 172 (corresponding to the RW code generator 112) and a PN code generator 174 (corresponding to PN code generator 114), respectively. The output of the correlator is applied to a Viterbi decoder 180. The output of the Viterbi decoder 180 is then passed to an overhead extractor 182 for extracting the overhead channel information. The output of the overhead extractor 182 is then passed via a codec 184 and a hybrid circuit 188 to a two wire interface 190 where the resulting analogue signals are passed to a selected telephone 192.

At the subscriber terminal 20, a stage of automatic gain control is incorporated at the IF stage. The control signal is derived from the digital portion of the CDMA receiver using the output of a signal quality estimator.

Figure 9:
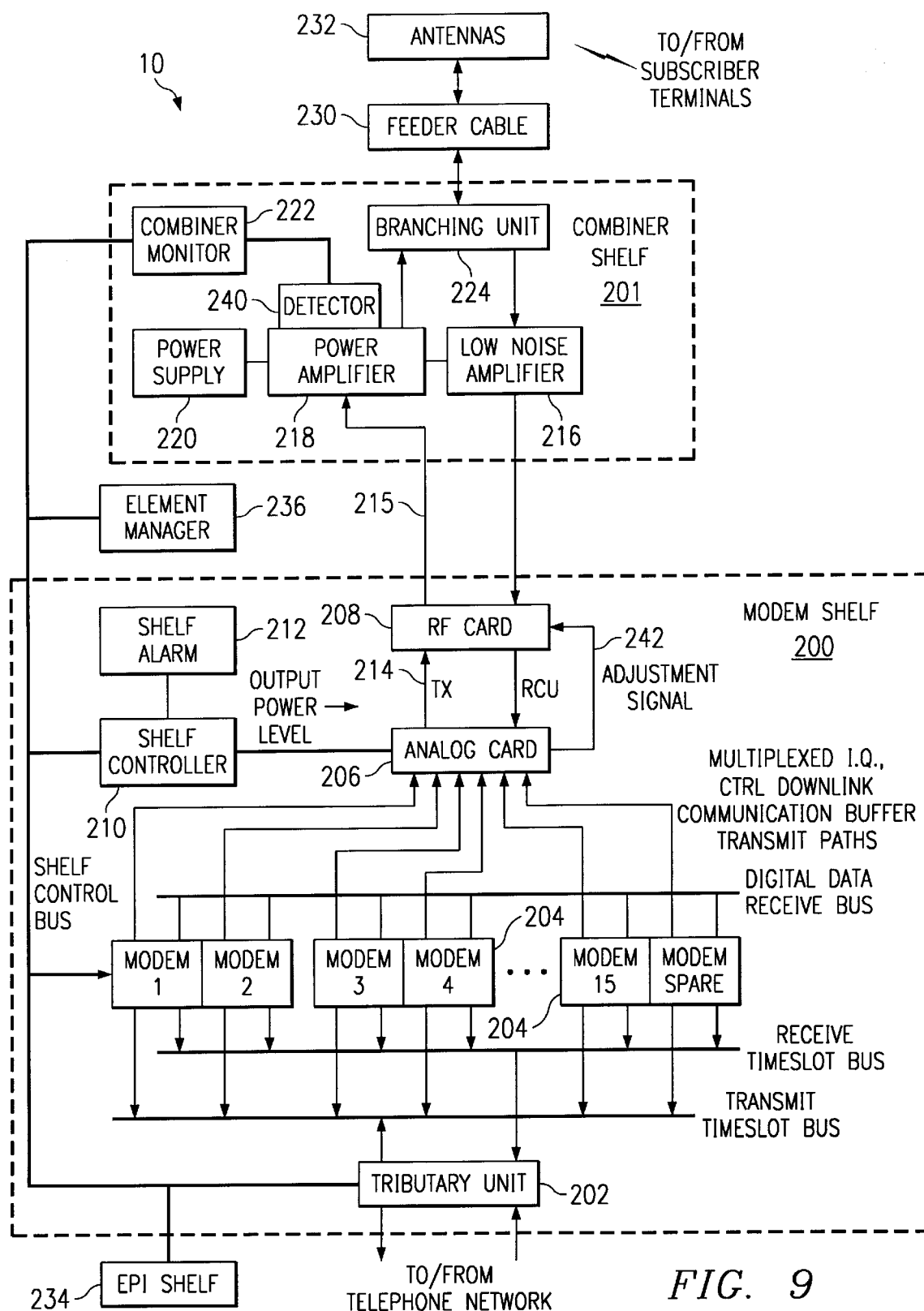
FIG. 9 is a block diagram of the central terminal in the wireless telecommunications system with an output power gain controlling feature.

FIG. 9 is a block diagram of central terminal 10 in wireless telecommunications system 1. Central terminal 10 includes a modem shelf 200 and a combining shelf 201. Modem shelf 200 includes a tributary unit 202, a plurality of modem units 204, an analog card 206, a radio frequency card 208, a shelf controller 210, and a shelf alarm card 212. Tributary unit 202 terminates connections to a host telephone network and handles the signalling of telephony information to preferably fifteen subscriber terminals 20. Modem units 204 perform the baseband signal processing of the transmit and receive signals to and from subscriber terminals 20. Analog card 206 performs analog to digital and digital to analog conversions, baseband filtering, and vector summation of the fifteen transmit signals from modem units 204. Radio frequency card 208 receives a composite transmit signal 214 from analog card 206 and generates a modulated transmit RF signal 215 therefrom. Radio frequency card 208 also recovers and amplifies baseband RF signals from subscriber terminals 20 for application to modem units 204 through analog card 206. Shelf controller 210 manages the operation of modem shelf 200. Shelf alarm card 212 indicates the operational status of modem shelf 200.

Combining shelf 201 includes a low noise amplifier 216, a power amplifier 218, a power supply 220, a shelf monitor 222, and a branching unit 224. Low noise amplifier 216 is designed to overcome losses in the antenna feeder, circulator, RF filter, and receive splitter. Power amplifier 218 amplifies the RF modulated composite transmit signal 215 to a desired transmit level. Power supply 220 supplies power to active components in combining shelf 201. Shelf monitor 222 reads operation and maintenance information and passes the information to shelf controller 210. Branching unit 224 provides combiner and RF filtering operations on the transmit side and circulating, RF filtering, and splitting functions in the receive side.

Central terminal 10 also includes feeder cables 230, antennas 232, an equipment power interface shelf 234, and an element manager 236. Antennas 232 provide the mechanism to receive and transmit radio frequency signals in conjunction with feeder cables 230. Equipment power interface shelf 234 provides connection to a local DC power supply and the fusing of various supply distribution channels within central terminal 10. An alarm system is also provided to detect faulty components within central terminal 10. Element manager 236 provides external control capability of central terminal 10 functions. Element manager 236 is designed to handle small or large networks of subscriber terminals 20 within wireless telecommunications system. For transmitting operation, tributary unit 202 receives telephony information from the telephone network. Tributary unit 202 provides telephony information to modem units 204 over a transmit timeslot bus. Telephony information from each modem unit 204 is received at analog card 206. Analog card 206 combines the telephony information from each modem unit 204 into a composite transmit signal 214. Composite transmit signal 215 is modulated into a radio frequency signal by radio frequency card 208. Modulated composite transmit signal 214 is amplified by power amplifier 218 for wireless transmission over antennas 232.

Power amplifier 218 includes a detector 240. Detector 240 measures an output radio frequency power of modulated composite transmit signal 215 from power amplifier 218. Detector 240 may also be used to measure output voltage from power amplifier 218 which is proportional to the output radio frequency power. The measured output radio frequency power is sent to shelf controller 210 through combiner monitor 222. Shelf controller 210 provides the measured output radio frequency power to analog card 206.

Analog card 206 determines a power estimate from the inputs of each modem unit 204 representing the downlink communication paths from central terminal 10 to subscriber terminals 20. Analog card 206 compares the power estimate to the measured output radio frequency power. Alternatively, analog card 206 may determine a voltage estimate from the inputs of each modem unit 204 for comparison to the output voltage measured by detector 240. In response to this comparison, analog card 206 generates an adjustment signal 242. Adjustment signal 242 adjusts a gain of radio frequency card 208 to control the output radio frequency power from power amplifier 218.

Adjusting the radio frequency gain allows wireless telecommunications system 1 to meet transmitted power specifications. Element manager 236 may be used to set the gain of radio frequency card 208 to an initial nominal value. For stability purposes, central terminal 10 establishes a desired transmit power level of 20 db+/−0.5 db per each subscriber terminal within wireless telecommunications system 1.

In summary, a central terminal controls a radio frequency gain by measuring an output radio frequency power of a modulated composite transmit signal. The modulated composite transmit signal carries the inputs from a plurality modem units representing the downlink communication paths from the central terminal to corresponding subscriber terminals. The output radio frequency power is compared to a power estimate of the inputs from the modem units. A radio frequency gain is adjusted in response to the comparison. Adjustment of the radio frequency gain maintains a constant output radio frequency power of the composite transmit signal, providing improved accuracy for the wireless telecommunications system.

Thus, it is apparent that there has been provided, in accordance with the present invention, an apparatus and method of controlling transmitter gain in a wireless telecommunications system that satisfies the advantages set forth above. Although the preferred embodiment has been described in detail, it should be understood that various changes, substitutions, and alterations can be made herein. For example, though an output power of the composite signal is measured and compared, other measurements and comparisons can be made to provide adjustments to the radio frequency gain. Other examples are readily ascertainable to one skilled in the art and could be made without departing from the spirit and scope of the present invention as defined by the following claims.

What is claimed is:

1. A method of controlling transmitter gain in a wireless telecommunications system, comprising the steps of:

generating a composite transmit signal from inputs for a plurality of downlink communication paths;

modulating the composite transmit signal;

sampling an output radio frequency power of the modulated composite transmit signal;

comparing the output radio frequency power of the modulated composite transmit signal with a power estimate determined from the inputs for the plurality of downlink communication paths; and adjusting a gain applied to the composite transmit signal in response to the comparing step in order to control the output radio frequency power of the modulated composite transmit signal.

2. The method of claim 1, wherein the comparing step includes measuring the power estimates of the inputs for the plurality of downlink communication paths.

3. The method of claim 1, further comprising the step of:

initially setting the gain of the composite transmit signal to a nominal set point value.

4. The method of claim 1, further comprising the step of:

maintaining a constant output radio frequency power for the composite transmit signal.

5. The method of claim 1, further comprising the steps of:

sampling an output voltage of the composite transmit signal, the output voltage being proportional to the output radio frequency power;

determining a voltage estimate of the inputs for the downlink communication paths;

comparing the output voltage to the voltage estimate; and adjusting the gain applied to the composite transmit signal in response to the comparison.

6. An apparatus for controlling transmitter gain in a wireless telecommunications system, comprising:

an analog card for generating a composite transmit signal from a plurality of downlink communication path inputs, the analog card determining a power estimate of the plurality of downlink communication path inputs;

a radio frequency card for modulating the composite transmit signal;

a power amplifier for amplifying the modulated composite transmit signal in preparation of wireless transmission; and a detector for measuring an output radio frequency power of the modulated composite transmit signal from the power amplifier, the analog card comparing the output radio frequency power with the power estimate of the plurality of downlink communication path inputs, the analog card generating a gain adjustment signal in response to the comparison.

7. The apparatus of claim 6, wherein the gain adjustment signal adjusts a radio frequency gain of the radio frequency card.

8. The apparatus of claim 7, wherein the analog card sets the radio frequency gain of the radio frequency card to an initial nominal value.

9. The apparatus of claim 6, wherein the gain adjustment signal maintains a constant output radio frequency power from the power amplifier.

10. The apparatus of claim 6, wherein the detector measures an output voltage from the power amplifier, the output voltage being proportional to the output radio frequency power, the analog card determining a voltage estimate of the plurality of downlink communication path inputs, the analog card comparing the voltage estimate to the output voltage, the analog card adjusting a radio frequency gain of the radio frequency card in response to the comparison.

* * * * *